United States Patent [19]

Carlson et al.

[11] Patent Number: 4,758,714

[45] Date of Patent: Jul. 19, 1988

[54] POINT-OF-SALE MECHANISM

[76] Inventors: Steven R. Carlson; Paul R. Carlson, both of 417 2nd Ave., S.E. Beach, N. Dak. 58621

[21] Appl. No.: 70,816

[22] Filed: Jul. 6, 1987

Related U.S. Application Data

[63] Continuation-in-part of Ser. No. 915,505, Oct. 6, 1986.

[51] Int. Cl.$^4$ .............................................. G06K 5/00
[52] U.S. Cl. .................................... 235/380; 235/448; 235/449
[58] Field of Search ............... 235/380, 382, 492, 448, 235/449

[56] References Cited

U.S. PATENT DOCUMENTS 3,821,518  6/1974  Miller .................................. 235/492

Primary Examiner—Harold I. Pitts
Attorney, Agent, or Firm—Dorr, Carson, Sloan & Peterson

[57] ABSTRACT

A secured point-of-sale mechanism is provided by a closable two compartment housing having (1) a secured portion which includes a printer and a plurality of signal devices for verifying that the mechanism is in a "locked" state and (2) an unsecured portion which cooperates with said secured portion in such a manner that transactions involving credit cards, negotiable instruments and the like are protected against unauthorized intervention. In certain preferred embodiments of this invention, the mechanism further comprises (a) means for accessing a computer system maintained by issuers of credit cards, negotiable instruments, etc., (b) means to access an external communication in order to identify a payor of a negotiable instrument and to perform an electronic funds transfer, (c) telephonic means to communicate with issuers of credit cards, negotiable instruments etc., and (d) a keypad, for customer use, which is located outside the closable two compartment housing.

13 Claims, 7 Drawing Sheets

U.S. Patent  Jul. 19, 1988  Sheet 1 of 7  4,758,714

POINT-OF-SALE MECHANISM

REFERENCE TO RELATED APPLICATION

This patent application is a continuation-in-part of our copending patent application Ser. No. 915,505 filed Oct. 6, 1986.

FIELD OF THE INVENTION

This invention relates to point-of-sale devices and more particularly to point-of-sale devices in which all of the transactions are completed without possible outside intervention. It is directed to cost-effective, OEM addressograph style mechanisms designed to utilize several types of existing credit cards such as a "PIN/ALGORITHM" or verifiable consumer oriented point-of-sale format plug all types of checks using the Federal magnetic ink character recognition (MICR) system.

BRIEF DESCRIPTION OF THE PRIOR ART

U.S. Pat. No. 3,786,421 to Wolfgang J. Wostl teaches a personal identification code number that is used to insude that the party making the transaction is the person he claims to be. Another relevant reference is U.S. Pat. No. 4,453,074. It teaches a smart card with encrypted material using a private key that is associated with a public key. U.S. Pat. No. 4,439,670 teaches use of a code comparison upon reaching a predetermined number of rejections.

SUMMARY OF THE INVENTION

Our point-of-sale mechanism provides a mechanism which operates in a highly desirable mode by locking both the card, the invoices, and any other negotiable instruments during the entire transaction. Any attempts to interfere with the transaction creates an abort and the system returns to its status quo. It gives the retailer badly needed security with minimum expenditures. With certain modular options, the mechanism also permits verification of travelers checks, smart card capability, electronic funds transfer from cards or checks, and lost or stolen credit card verification. The system can utilize several algorithm security codes simultaneously and can be programmed to give regional or local protection.

Our secured point-of-sale mechanism comprises a closable two compartment housing having (a) a secured portion including a printer means and a plurality of signal devices indicating the condition of a plurality of circuits contained in said secured portion of said housing; (b) an unsecured door portion cooperating with said secured portion for completing said two compartment housing; (c) a monetary negotiable instrument section disposed within said unsecured portion having first part for retaining a credit card, a second part for retaining an invoice of a point-of-sale transaction, a third part for retaining a check for a point-of-sale transaction, a fourth part for retaining any monetary negotiable instrument, a fifth part for identifying the payee of said transactions, and a sixth part for establishing the transaction selling price; (d) a transaction price index settable to the correct sales amount purchased by a customer; (e) a first plurality of switching mechanisms having a first part fixed in said secured portion of said housing and a second part extending into said unsecured portion of said housing to be actuated by said unsecured door portion; (f) a second plurality of switching mechanisms having a first part fixed in said secured portion of said housing and a second part extending into said unsecured portion of said housing to be actuated by a combination of monetary negotiable instruments; and (g) a locking mechanism connected to said pluality of switching mechanisms and disposed between said secured and unsecured portions of said housing for securing said housing against invasion as long as said plurality of switching mechanisms are actuated.

Our secured point-of-sale mechanism also can be modified and/or augmented in several ways. For example it could include one or more of the following features: (I) means to access a computer system maintained by an issuer of a negotiable instrument, credit card and the like; (II) means to access an external communication system to identify a payor of a negotiable instrument (such as through the use of a personal identification number) and to perform an electronic funds transfer; (III) telephonic means (such as a telephone headset and appropriate communication system) to communicate with the issuer of a negotiable instrument; (IV) telephonic means specifically adapted to communicate with the issuer of a credit card; (V) a keypad which is adapted for customer use (e.g., for entry of the customer's personal identification number) which is located outside the closable two compartment housing; (VI) a standard 8 bit microprocessor capble of accessing 64K bytes of memory; and means connecting the plurality of switching mechanisms and the locking mechanisms to the microprocessor and upon any one of said switching mechanisms not being actuated, said locking mechanisms seeking an inoperable position; (VII) a printing mechanism specially adapted for printing upon an invoice, negotiable instrument, etc. by means of a pair of plates spatially disposed about any of said credit cards, invoices, checks or other monetary negotiable instruments; an actuating mechanism cooperating with said printing mechanism for producing an imprinted instrument of said transaction; and a lock disabling mechanism connected to said actuating mechanism being disposable after creating an imprinted monetary negotiable instrument; (VIII) read head means connected to said microprocessor and disposed adjacent said credit card for reading any magnetic code that is detectable in said card; and read head transport means for producing movement of said read head means under said credit card as long as said code is being detected by said read head; (IX) a monetary negotiable instrument carrying a MICA stripe on its surface disposed within said secured portion having a first part for retaining said magnetic stripe with said negotiable instrument also carrying a magnetic stripe on its surface disposed within said secured portion having a first part for retaining said magnetic stripe; read head means connected to said microprocessor and disposed adjacent said monetary netogiable instrument to read any code impressed therein; PIN identification number entry means connected to said microprocessor for receiving PIN number; and means including said microprocessor connecting said read head means and said PIN identification number entry means to said printing mechanism and said actuating mechanism said printing mechanism to be actuated when said signals are the same; (X) an override mechanism; a smart key pad connected to said override mechanism having detection means for detecting the presence of said smart card; and a personal identification number module having a key tab matrix connected to said microprocessor, said key tab matrix having been set to match the transaction amount to be recorded with said override mechanism being connected to said microprocessor for actuating said printing mechanism and said locking disabling mechanism; (XI) a high strength steel drawer slidable within said secured portion of said two compartment housing, said drawer having individual electrical compartments for containing said security modules; wide flange means formed on the outside of said steel drawer to engage said two compartment housing; a connector electrically connected to said individual electrical compartments in said steel drawer and to said microprocessor; and locking means securing said steel drawer within said two compartment housing and further securing said security modules to said steel drawer; and (XII) a first read head connected to said microprocessor and disposed adjacent a first monetary negotiable instrument within said section; a second head connected to said microprocessor and disposed adjacent a second monetary negotiable instrument within said section; a track mechanism for guiding a transport means; first transport means producing movement of said first read head over said track mechanism; second transport means producing movement of said second read head over said track mechanism; and means connecting said first and second transport means to said microprocessor and causing movement of the same as long as a code is being detected by said first and second read heads.

It is therefore a general object of this invention to provide a secured point-of-sale mechanism that is secured against invasion from the outside.

It is another object of this invention to provide a secured point-of-sale mechanism that is connected to a micro-processor that completes all transactions while the mechanism is secured.

It is yet another object of this invention to abort any transaction while the mechanism is secured where invasion from the outside occurs.

It is a further object of this invention to use all forms of negotiable instruments at the point of sale and secure the transaction taking place.

It is still another object of this invention to provide a printed record of the transaction taking place at the point of sale.

It is still another object of this invention to provide a lock disabling mechanism actuated upon the printing mechanism printing a record of the transaction taking place.

These and other objects and advantages of the invention will more fully appear form the following description, made in connection with the accompanying drawings, wherein like reference characters refer to the same or similar parts throughout the several views, and in which:

BRIEF DESCRIPTION OF THE DRAWINGS

FIGS. 15, 15A are diagrammatic views of the use of credit cards, checks, invoices and travelers checks with appropriate PIN'S and detection devices.

DETAILED DESCRIPTION OF THE INVENTION

Figure 1:
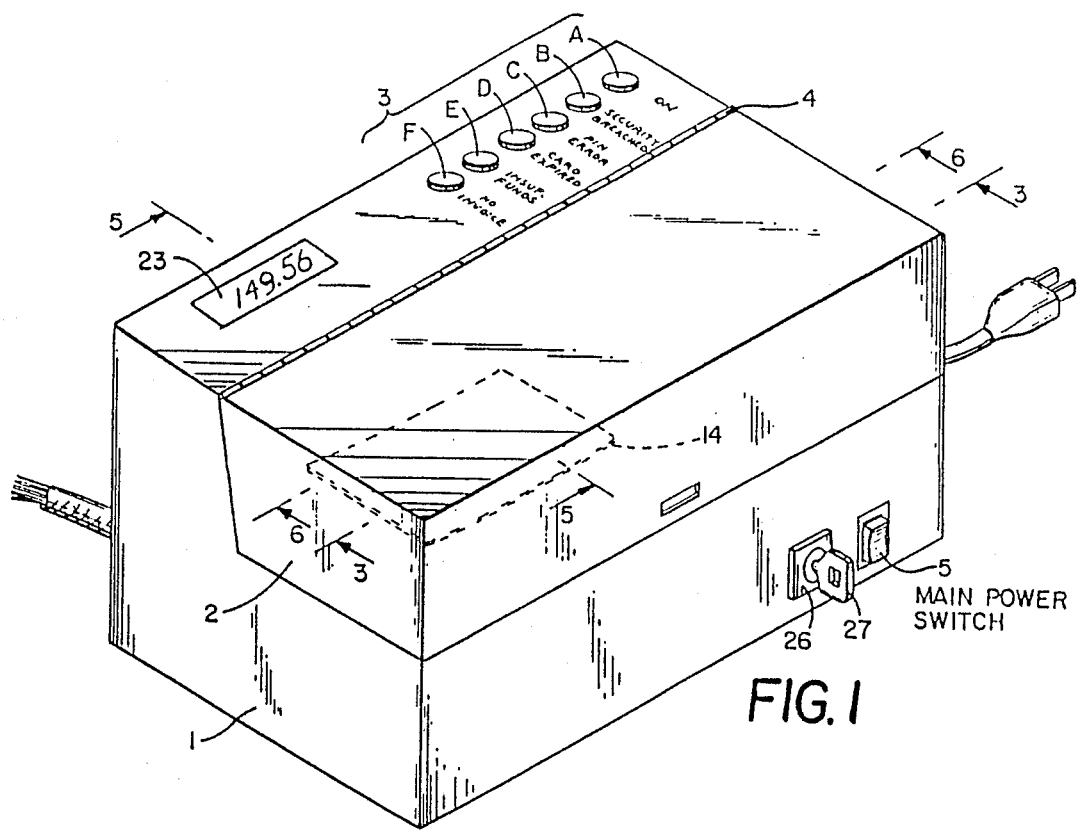
FIG. 1 is an isometric view of the point of sale device.

The sturdy main case of the device, 1-1, is formed of metal and skillfully designed to be aesthetically pleasing with careful attention to color coordination and physical refinements. The case, along with the heavily constructed steel cover, 1-2, protects the internal electronics from harmful magnetic and RF fields, dirt, corrosion, etc., as well as providing system integrity from vandalism, abuse, tampering, and so on. Reference to the first number goes to the Figure and the second number goes to the identification or reference number in that Figure. The cover, itself a vital part of the printing process, hinges upward at 1-4 exposing the retailer-operated functions. Lamps 1-3 are "condition lights" relating systems and procedures statuses. Switch 1-5 is the main power switch controlling both mainframe and all outboard module current. Indicator 1-23 displays the total sale to the operator equally well in all light, from direct sunlight to total darkness. FIG. 1 also shows an optional standard telephone headset, 1-97, and its associated hanger, 1-98. The function(s) of the headset will be described later in this patent disclosure.

Figure 2:
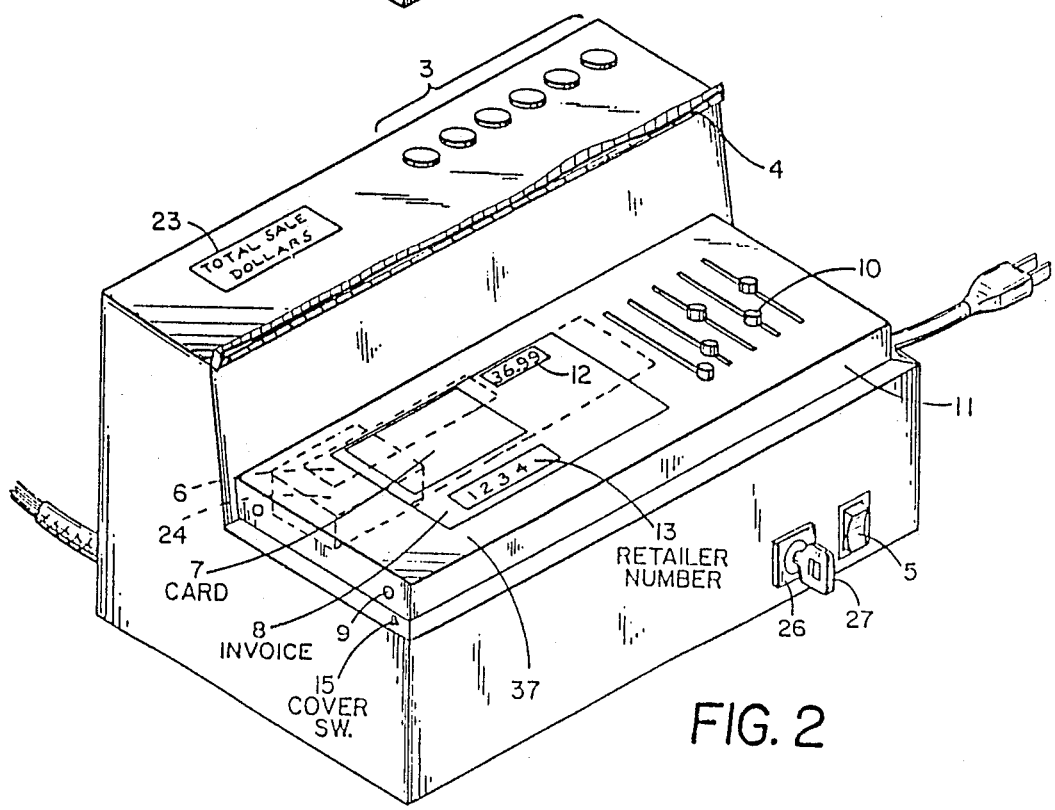
FIG. 2 is an isometric view of the invention with the cover broken away.

FIG. 2 shows the device with the cover, 2-2, removed, although the system cannot be operated in this condition as explained later. A customary manual "purchase amount" matrix is pictured at 2-12 with its associated manual control at 2-10. However, an alternative electronically controlled matrix using a numeric keyboard at 2-10 may prove more reliable and workable in conveying sales amounts and other information to the outboard modules. Although the cover 1-2 is shown as completely enclosing and covering the sales amount entry keypad, whether it be the traditional manual type of an electronic, alpha-numeric keypad, an optional cover which does not enclose the keypad can also be employed and it is shown as 1-95 thereby omitting that portion shown as 1-96. The optional cover, 1-95, will not in any way alter or jeopardize the described security of the entire device since the keypad, 2-10, will become inert and inoperable once the 1-2 or (1-95 optional) cover is closed since it triggers the 2-15 cover switch(s) and all functions associated therewith leaving the credit cards, appropriate invoices, checks, traveler's checks and other appropriate negotiable instruments locked under cover during the actual verification/authorization and transaction cycle. The retailer's identification number is printed by his cast matrix 2-13 on an invoice, 2-8. The customer's credit card, 2-7, is placed face up in its normal position (the positioning guides 15-72 may be replaced by a recession slightly larger than the size of the card) directly over the verifier access door, 206, located beneath the invoice and the card. The verifier access door is actually a part of the verifier traction mechanism, as shown in 2-24, and more particularly as disclosed at 5-24 and 6-24. The cover, 1-2, fits down over the main deck housing 2-37, and onto the rabbet, 2-11 activating the nondefeatable cover switches, 2-15, (only one shown in FIG. 2) and in this closed position is able to be secured by the locking pins shown as 2-9. These locking pins fit into recesses in the lid at 3-22.

Figure 3:
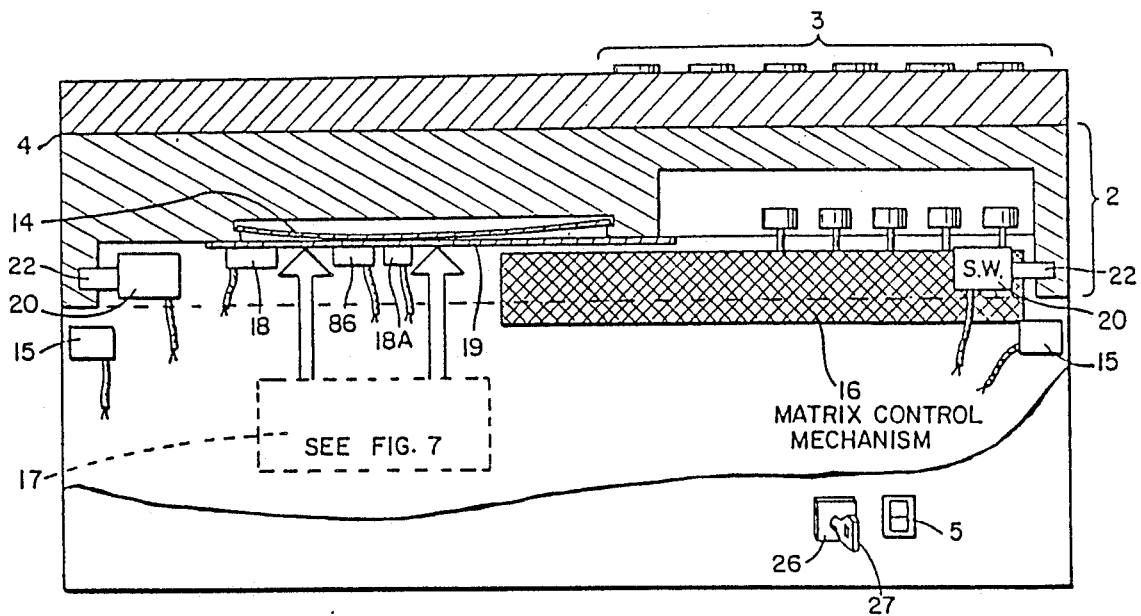
FIG. 3 is a sectional view of the invention taken along lines 3—3 of FIG. 1.

FIG. 3 shows the printing mechanism consisting of a lightly convex-shaped steel "spring plate" 3-14 mounted into the cover 3-2, a heavy, rigid "printer plate" 3-19 and the print actuator, 3-17. This printing mechanism, whether it be of the "spring plate printer plate" type described herein or any other means of printing appropriate information on any negotiable instrument used in this device will be securely locked under the metal deck shown as 2-37 (13-37 and 15-37) which is in fact part of the main case shown as 1-1. The 2-37 deck, which is part of and becomes part of the 1-1 main case, cooperates at all times with 1-1 to maintain the security of the device. The 2-37 deck can only be removed (for servicing of the device) by authorized service personnel using proper identification means. When all security and transaction conditions have been correctly met, the actuator carries the "floating" matrices 2-12, 2-13 and the credit card upward and squeezes them and the invoice between plates 3-14 and 3-19 to print the invoice. The convex shape of the spring plate "rolls" the printing process to the outside edges of the invoice assuring clear printing. An optional printing means to imprint proper and appropriate data on any of the mentioned negotiable instruments may include a "dot matrix" printer means. The choice of printer means will be dictated by cost considerations, available and desirable options, and the size, shape and type of invoices and negotiable instruments that may be used.

Closing the cover automatically signals the onboard CPU to ask the following (and other) questions: (A) Is the cover locked (signified by the 3-20 solenoids being engaged)? (B) Is there a valid smart card inserted at 4-66 or a credit card and invoice present (proper responses from 3-18 and 3-18A)? (D) Does the purchase price matrix mechanism (3-16), or the numeric keypad, show an entry? (E) Does the PIN entered by the customer match the one interpolated by the onboard algorithm decryption systems from the card mag-stripe or the smart card? (F) Does the search reveal a terminated, stolen, counterfeit or over-extended card? Only if all questions are correctly answered will the CPU allow completion of the transaction. Completion involves recording of the transaction, charging the smart card the appropriate amount (and recording same) and actuation of the print mechanism, 3-17, moving it upward to print the invoice. When the print mechanism has cycled, whether it be mechanical, dot matrix, electrical or other, the cover automatically pops open which clears the computer and the process begins again.

FIG. 3 also shows the relative position of the matrix control mechanism, 3-16 used in the traditional mechanical means, to the print plate, 3-19, and the cover solenoid lock mechanism, 3-20, which slides the large steel pins, 2-9, into the recesses shown at 3-22.

Figure 4:
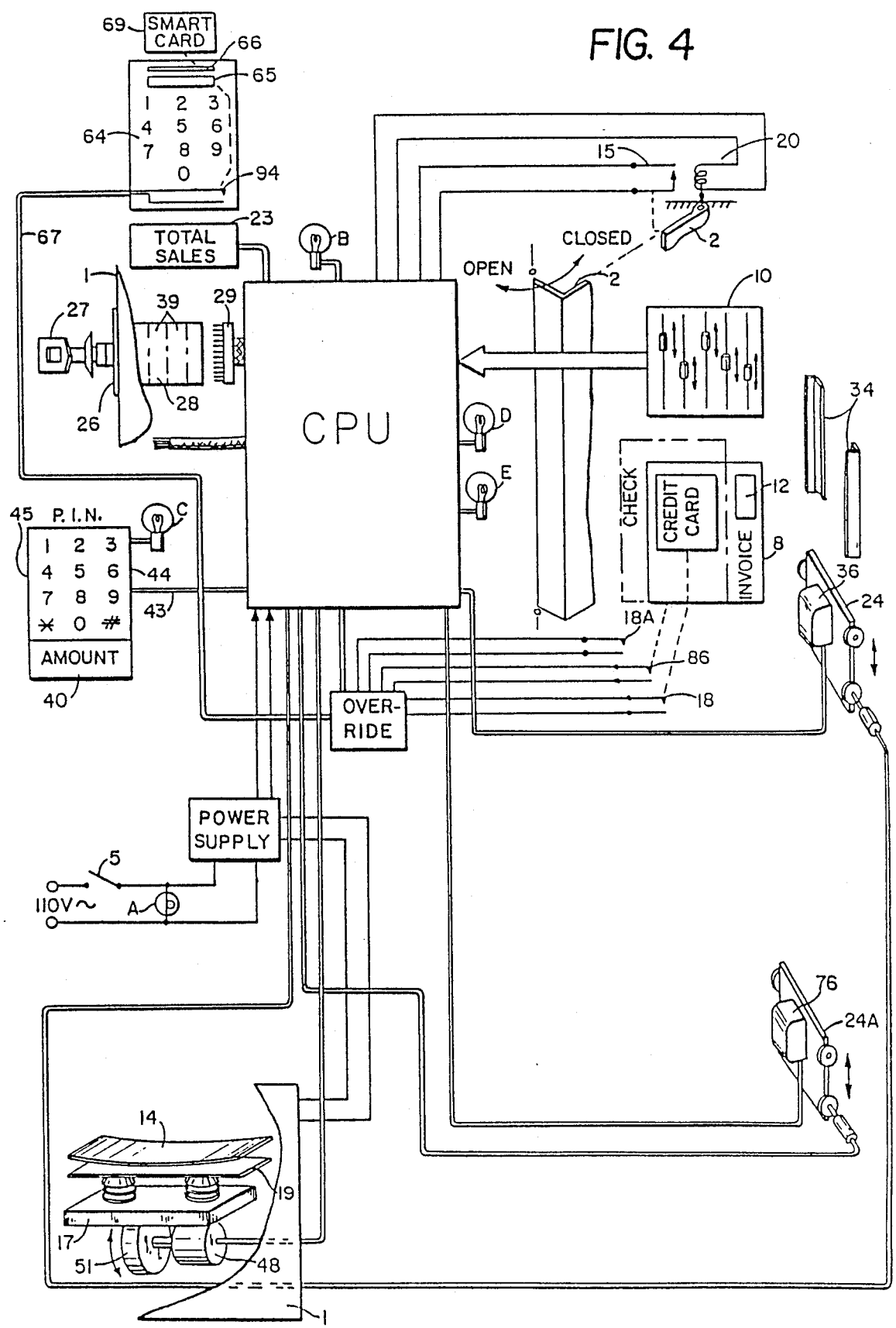
FIG. 4 is a schematic diagram of the components of the invention.

FIG. 4 shows the positioning of the security electronics iin the heavy metal drawer, 4-28. This drawer completely encloses the vital security and interface modules and protects them from outside probing, tampering and vandalism. The security drawer is externally locked by a high quality lock, 4-27, and when fully inserted into the system mainframe, connects with associated internal electronics via a reliable multi-pin connector, 4-29. The wide flange on the drawer, 4-26, assures that the security modules 4-39 will disconnect from 4-29 and destroy themselves (via self-destruct circuitry) before any probes can be introduced into the module area. Each 4-39 module contains electronics (and algorithm decryption circuits) unique to each card or check issuer.

The actual transaction printing process beings when the retailer lifts the normally unlocked cover, 1-2. Lifting the cover off the switches at 3-15 (3-15A) triggers the security systems and alerts the electronics (CPU) to receive the customer's personal identification number (PIN) which is conveniently entered on the numeric keyboard FIG. 4-44. Meanwhile, and not necessarily in this order, the retailer will enter the purchase price at 2-10 or 4-64 which will read out automatically to the customer and the retailer at 2-23 and 4-65 and 4-40, and insert the credit card and the invoice in the system which triggers the "card/invoice present" switches at 3-18 and 3-18A. Insertion of a valid smart card in slot 4-66 overrides the "card present" function of 3-18A.

Rather than having separate housings for the PIN keyboard 4-45 and the "smart card reader" 4-64 as shown, the units could be contained in the main housing unit 1-1 to eliminate the need for outboard mechanisms.

When the cover (1-2) is closed for the verification-/authorization and printed cycle, a present tension of the print plate 3-19 squeezes the card and/or invoice against the spring plate (3-14) just hard enough to insure proper operation of the "card/invoice present" switch and to offer card stability during the mag-stripe scan but not hard enough to print. In the event that an optional "dot matrix" or other printer means is employed, the 1-2 cover may still use pressure means to hold the various cards and/or negotiable instruments in place during the described device functions.

When the retailer closes the cover to print the invoice, the 3-15 (3-15A) switches activate the solenoid cover locks and signal the CPU to being the system analysis and card verification/authorization functions. The credit card, invoice and purchase price matrix remain locked under the cover until either (A) the successful verification/authorization and transaction cycle opens it, or (B) the transaction is aborted due to a security breach in the system or a premature removal of the smart card, or (C) the transaction is terminated because an incorrect PIN is detected or not received within 30 seconds, a smart card reveals insufficient funds, or a system search reveals an invalidated, bogus or stolen card has been presented. Any detected fault will automatically abort the transaction and the cover will unlock and open without printing the invoice and/or charging the purchase to the smart card.

Figure 5:
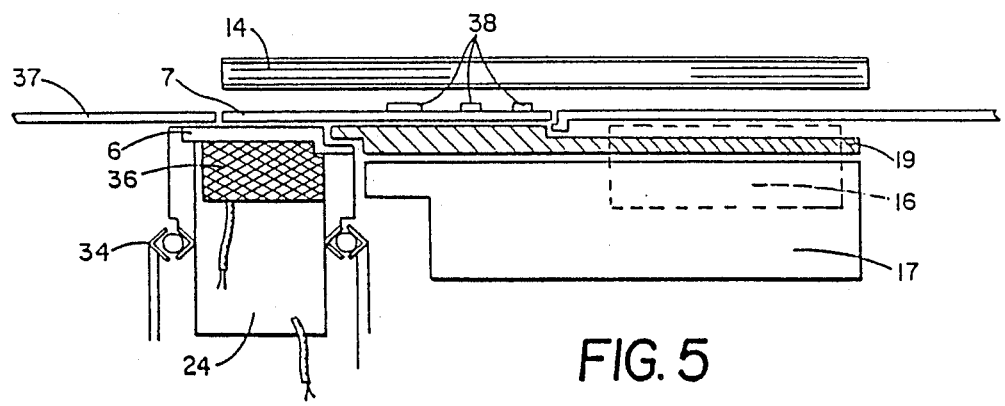
FIG. 5 is a partial side section of the invention taken along lines 505 of FIG. 1.
Figure 6:
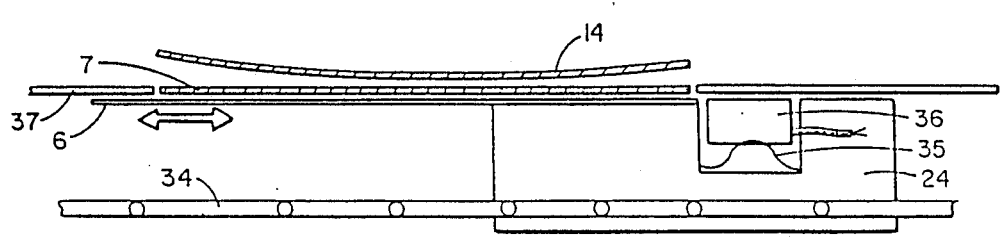
FIG. 6 is a partial rear section of the invention taken along lines 606 of FIG. 1.

FIG. 5 illustrates the system's mag-stripe scanning mechanism. This figure is a side view showing the credit card, 5-7, being held in place by the curved spring-plate 5-14 and the recess in the printer-plate deck housing, 5-37, which limits the card's lateral movement. Since printing pressure need only be applied beneath the card's embossments at 5-38, the retailer's matrix (2-13) and the purchase amount matrix 2-12, the print plate 5-19 leaves the card's mag stripe readily exposed for scanning by the mag-stripe reader, 5-36 and MICA read head 4-76. During scanning, the reader's transaction unit, 5-24, 6-24, moves read head 5-36 and MICA read head 4-76 from left to right following a precision path afforded by a ball bearing and track system, 5-34 and 6-34. The read head scans all three tracks of the mag-stripe simultaneously and the CPUs decipher appropriate information and automatically select the correct security module 4-39 to deal with the PIN verification process. In the case that "MICA" information is required due to the presentation of a check, Traveler's check, etc., that information is automatically read and appropriate security modules selected in the same manner. If the correct module is faulty, damaged or nonexistant, or if the customer has entered the wrong PIN, the transaction is aborted and the cover opens automatically resetting of the machine. This allows another attempt for the correct PIN by the customer or easy removal of the card and invoice. Should more than one attempt be made for the transaction with the systems automatic functions repeatedly yielding an abort command and denying the transaction, a telephone headset, 1-97, may be provided for direct voice contact with the appropriate company or bank to resolve the situation via personal contact. The phone headset will rest in a suitable hanger, 1-98, when not in use.

The mag-stripe reader 6-36 and the MICA reader are assured effective and reliable contact with the mag-stripe by "floating" over the stripe with the aid of a sensitive suspension system, 6-35, which allows operation in attitude. The read head begins its course in almost direct contact with the mag-stripe due to its location in relation to the card and the verifier access door, 6-6 and 2-6. This access door immediately precedes the read head on its path across the mag-stripe and returns with it to offer secure protection against dust, intrusion and vandalism.

FIG. 4 illustrates the customer's PIN entry keyboard module, that has a main housing, 4-45. The keyboard, 4-44 uses reliable, long life, magnetic contact keys resistant to dust, moisture, sunlight, most common solvents and cleaners and reasonable abuse. A purchase amount display, 4-40, which matches the mainframe display 1-23 allows the customer and the retailer to monitor the purchase being selected by the retailer on the print matrix. The keyboard is connected to the main body by means of a high quality multi-conductor cable, 4-43. As mentioned elsewhere, this PIN entry keyboard module may be mounted, as an option, directly onto the customer's side of the 1-1 main case. This would possible take less space in an environment where there is no room for the PIN entry keypad.

Figure 7:
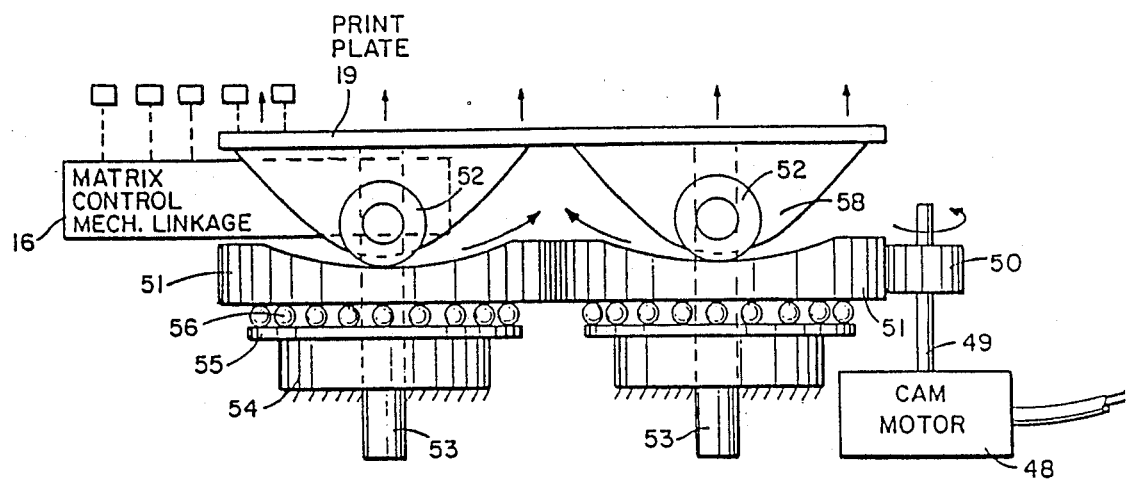
FIG. 7 is a sectional view of the printing mechanism in its lower position.
Figure 8:
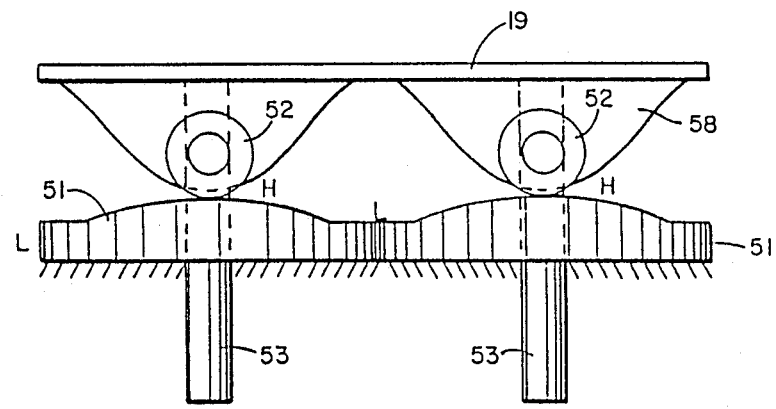
FIG. 8 is a sectional view of the printing mechanism in its upper or print position.
Figure 9:
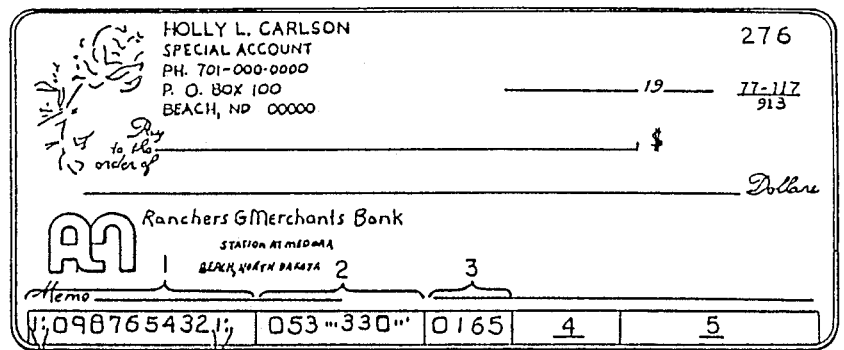
FIG. 9 is a diagrammatic view of a check.
Figure 10:
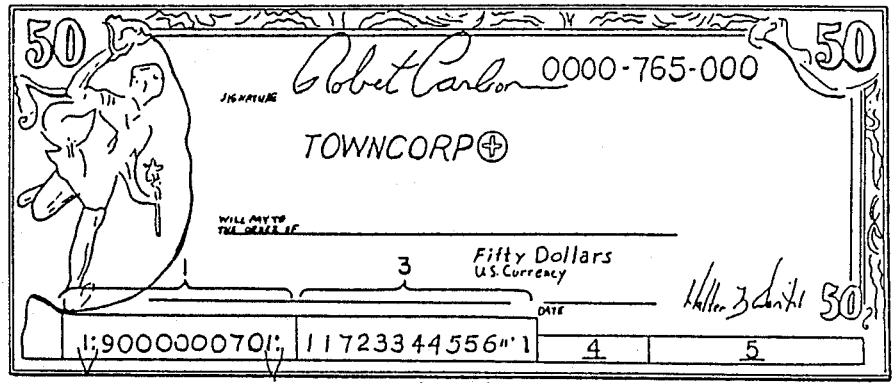
FIG. 10 is a diagrammatic view of a travelers check.
Figures 11, 12:
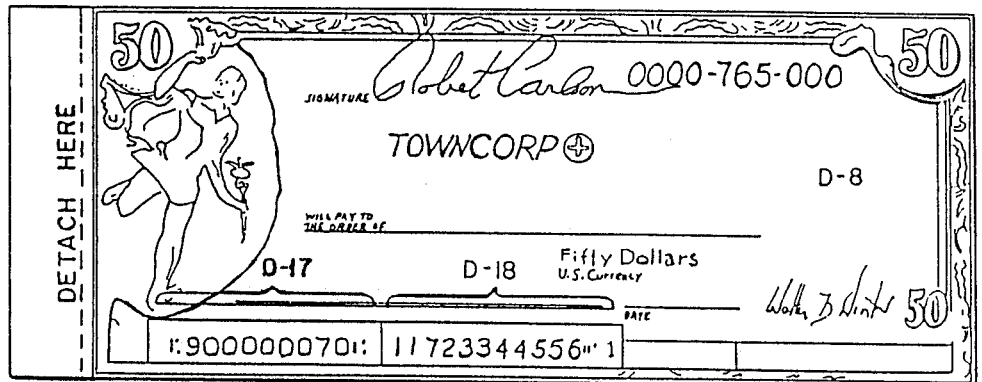
FIG. 11 is a diagrammatic view of a modified travelers check.
FIG. 12 is a diagrammatic rear view of the modified travelers check.

FIG. 7 and 8 are more detailed drawings of the print actuator mechanism previously shown as 3-17. It consists of two cam wheels, 7-51, driven in opposite directions by means of gear teeth. Both are driven by the cam motor 7-48, through its drive shaft (7-49) and cam drive gear (7-50). Each cam wheel gear (7-51) has two "high" lobes and two "low" lobes indicated by "H" and "L" markings respectively. These lobes are "timed" so that all four print-plate lift wheels, 7-52, center on either H or L positions simultaneously to achieve equal lift throughout the print cycle. Only one-half revolution of each cam-wheel is required to complete each print cycle so that cam motor (7-48) may be gear (speed) reduced to achieve a slow enough rotation and adequate torque to lift the print-plate through its cycle. The 7-51 cams, the print-plate support body, 7-58, and the cam table (ball) bearing (7-56) and bearing race (7-55) are all precisely aligned by the two cam shafts, 7-53. These shafts drift upward with the print-plate and its support mechanisms (and the matrices) while the cam gears and table bearings remain firmly seated on the main-frame body represented by 7-54. The print-plate support body is construed so as to allow sufficient clearance for the purchase-price matrix assembly (7-16).

Regarding the check verification function, suppose an unknown customer from Montana, for example, out of state, would find himself without cash or credit cards. The customer would present his check to the retailer with this system. The retailer would insert it in the proper fashion into the system, enter the check amount at the keypad (2-10) and close the lid. The retailer would then press the "verify" button on top of the system ( in the area of 1-3) and wait. The system would activate the verification mechanism, FIG. 5 and 6, which would "read" the MICA information and compare the offset or PVV number and subsequent PIN with the PIN entered by the customer at 4-44. If the PINS match, the the CPU would activate the "Phone in Verification Module" which would include a suitable modem for an AT&T hook-up with the Fed's MICA system. This would connect the system to the customer's own bank and the check could be verified for sufficient funds and proper I.D. If all is correct, the system would stamp the word "Verified" on the check and the lid would pop open resetting the machine for the next transaction.

This invention anticipates the use of checks as they currently exist using the Fed MICA system. However, a modified check may be used in the future which is a standard check save for the addition of an "NCR" (no carbon required) slip on the back entitled D-8 and a mag-stripe adhered to the front labeled D-17/D-18 shown in FIG. 11. The NCR page would include the amount of the check, D-16 and the serial number of the check D-15 as well as the company's logo and other regulated information. It may or may not include the duplication of the payer's signature and countersignature, D-11 and D-13. However, it would naturally reproduce the Payee's name, D-12 and the date, D-14. D-11 and D-13 could possibly be obscured by a vision blocking ink screen such as seen on common personal checks with NCR pages. However, a preferred method to handle personal checks, Gov't checks, Travelers checks or any negotiable instrument using the Fed's MICA system would be to utilize the optional "dot matrix" or comparable type printer together with the optional alphanumeric keypad at 2-10 (15-10 and 14-10) and the onboard CPU's and verification circuitry to automatically contact the issuer's bank computer, electronically transfer the required funds directly to the payee's bank account ("electronic funds transfer" also known as "EFT") and then cancel the check or instrument in the device all at the point-of-sale. This would be accomplished in much the same way as EFT is used with bank credit cards today. Those skilled in the art will readily recognize that this method is preferred should applicable laws allow. The scenario of the EFT-/POS-CANCELLATION will be as follows: Mr. XYZ is out of town and wants to make a purchase at a stranger's establishment. He would present his check, already filled out in full as per customary procedures. The retailer would punch in the check amount at 2-10 which would read out at 2-23 for the retailer and the customer to see and then place the check in the device and close the 1-2 lid. The customer would then enter his personal identification number at the PIN keypad. It should be noted here that the machine will only take a PIN entry a certain number of second before the 1-2 lid is closed and will accept a PIN entry only a certain number of second after the 1-2 lid is closed. This is to help prevent a "residual" PI entry from incorrectly hindering a legitimate sale and enhance the security of the device. When the 1-2 lid closes the device's CPU (which may or may not contain the customer's PIN entry at this time) will trigger the function of the MICA read head assembly to "read" the data on the check. If a mag-stripe is located on the check, it will also read that information. The CPU will then compare the PIN entered by the customer to that interbolated from the MICA information. This interbolation process may utilize the onboard algorithm modules in the module drawer or may depend upon outboard interbolation. Outboard interbolation would allow each bank to solely hold their own encryption/decryption methods and algorithm thus maintaining a higher state of security. Returning to the scenario; if the onboard CPU cannot interpret the PIN matchup, then it would automatically call up the MICA network and using the routing and transit numbers on the face of the check would locate the very bank this particular check issued from. The MICA information sent from the onboard CPU would enter the bank's computer via suitable circuitry whereupon the bank's computer would use the encryption/decryption methods and/or algorithms known only to it to make the PIN comparison. For example, the bank's computer may use a combination of routing and transit numbers, account numbers and even individual check numbers in conjunction with their own security algorithm (known only to this bank's computer and perhaps key personnel) to arrive at a PIN which would either match or not match with that entered by the customer at the point-of-sale. At an appropriate time, the bank's computer would be told the amount of the check and its individual number as supplied by the POS terminal, examine whether the customer's balance is sufficient to cover the check, receive the payee's bank number and account number, and if all functions are deemed desirable, the payer's bank computer would electronically transfer the funds and debit the payer's account. The payee's routing and transfer and bank numbers and the payee's account number would be transferred to the payer's bank computer only after a satisfactory PIN match had been made. It should be noted that the POS device described herein can be programmed with the retailers (payee's) routing and transit numbers, bank numbers and account numbers quite easily via the 2-10 keypad by qualified personnel. Then, after the EFT had taken place, the payer's bank computer would wire the appropriate check cancellation information to the POS terminal which would then (A) print it on the back of the check via the dot matrix printer and (B) if the "daily totals" option is onboard, would add the amount of the EFT to the daily total. The 1-2 cover would then pop open and the cancelled check would be presented to the customer as part of his receipt. Thus, the banks are shifting much of their check handling to the point-of-sale.

The above mentioned check cancellation information would usually include something like, "Point-of-Sale Cancelled - Pay any Bank PEG 011386 FRB MPLS 0911-00036" and so on. The advantages of POS cancellation are numerous and obvious to one skilled in the art and make the use of checks more desirable and secure. For example, a traveler's check serial number, part of the transmitted MICA information would only clear the traveler's check issuer's bank once. Their computer would only accept that serial number once; all additional attempts to cash a Traveler's check with the same serial number would be regarded as counterfeit and rejected. The same sort of safeguard would apply to personal checks, each with its own check number, Gov't checks and the like.

FIG. 3 shows the described printing mechanism consisting of a convex shaped, steel "spring plate" (3-14) mounted in the cover (3-2), with a corresponding flat steel "print Plate" (3-19) and the print propulsion system or actuator shown as 3-17. When all security, verification/authorization and transaction conditions have been correctly met, the 3-17 actuator carries the appropriate embossments and matrices upward and squeezes them and the invoice or check between plates 3-14 and 3-19 thereby printing the information on the check or invoice. The convex shape of the spring plate "rolls" the printing process to the outside edges of the invoice assuring legible reproduction. This "squeezing" method eliminates the "shearing" action of many common printers and the problem associated therewith. The dot matrix type of printer may be preferable since it would more easily print the card authorization numbers on card invoices and be able to print all appropriate EFT and Point-Of-Sale check cancellation information on checks.

When the cover (1-2) is closed for the verification and print cycle, a preset tension of the print plate and/or spring plate (3-19 and/or 3-14) squeezes the card and invoice or traveler's check, personal check, Government check (all types), food stamp etc., against the spring plate and/or print plate just hard enough to insure proper operation of the "card/invoice/check present" switches and to offer card stability during the magstripe or MICA scan but not hard enough to print.

All security sensors and devices relating in any way to the system Main-frame and its modules, AT&T phone modems and the like, are continually being monitored by their associated CPU's to insure uninterrupted integrity of the system device and the algorithm modules located at 4-39. Back-up battery power provided by the system main-frame will have its own internal charger to assure power should the AC line fail.

The 4-39 security modules wll be powered during shipment to individual systems locations by their own inboard lithium batteries (or suitable substitute) and will have the ability to monitor their own security during said transit. Should modules sense serial scanning, X-rays, infra-red rays (used for disarming etc.), or other types of "electronic tampering" designed to disarm security or otherwise compromise the integrity of the security modules, the battery power will last a minimum of ninety (90) days from the date of manufacture and should the ninety days pass before a 4-39 module is installed, it will automatically "dump" the secure algorithm chips. The security chip will destroy itself automatically upon any interference of power.

OPERATIONAL/TRANSACTION/VERIFICATION/PRINT CYCLE

The actual transaction/verification/print cycle begins when the retailer lifts the (normally closed) cover, 1-2, to insert the credit card, invoice, check, food stamp etc. Lifting the cover off the non-defeatable switches at 3-15 far enough (this is a two stage switch as will be explained later) alerts the systems's CPU to begin a thirty (30) second countdown in which the customer must enter his PIN number at the keypad (4-44).

The retailer will enter the purchase price amount at 2-10 (or if a smart card is being used, 4-64) which automatically sets the entered amount at 2-12 which then reads out to the customer and the retailer at 4-40 and 2-23 and 4-65, only if a smart card is being used.

Figure 15:
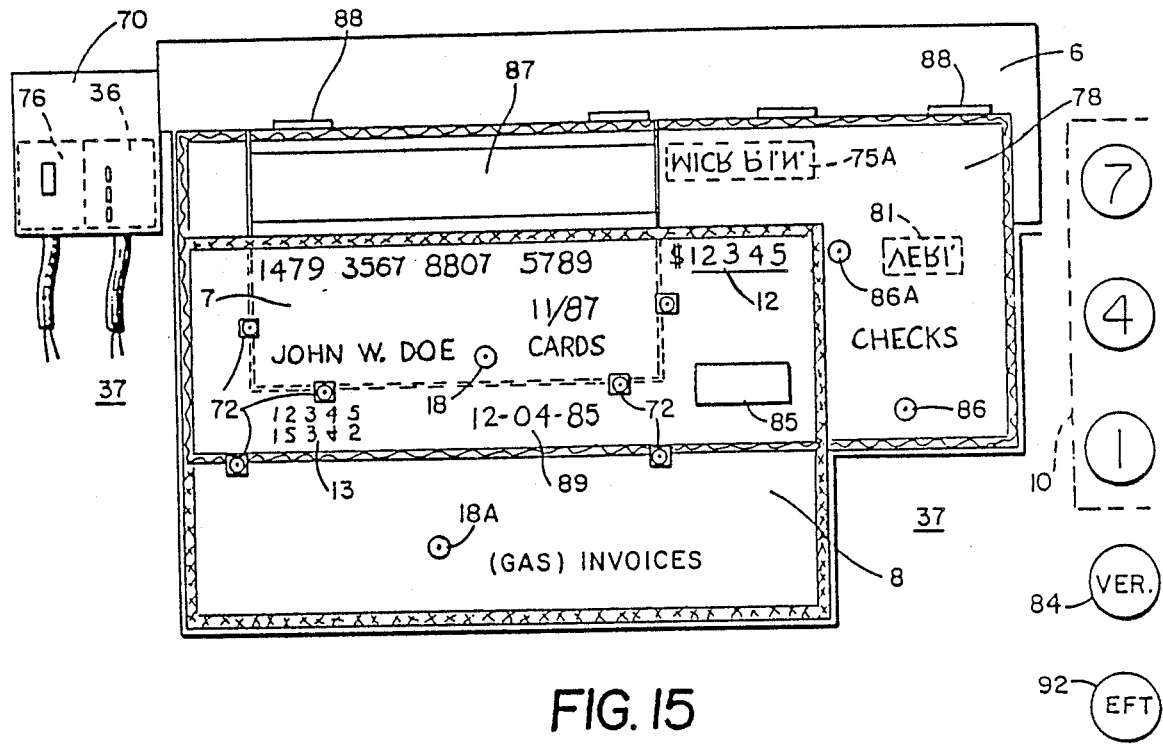

The retailer will insert the credit card, travelers check, personal check, food stamp and/or invoice in the system at their proper location as seen by FIG. 15. These will be held in place prior to spring plate pressure by the retractable pin guides, 13-72 and 15-72, guides at 15-88 (or the alternative slot 16-91 and/or appropriate recesses in the deck housing). It consists basically of a lengthened 14-70 reader housing thereby creating a slot or groove long enough to insert the entire (long) edge of a 15-78 check. It may in face be long enough for common larger checks such as payroll checks, etc. This groove 16-91 in the 16-16A verifier access door insures reliable reading of the MICA line and all tracks of the credit cards. This is accomplished since proper insertion by the retailer will necessarily eliminate folds and wrinkles in checks and food stamps and may even accommodate minor tears and destruction of the MICA line area. The "bottom" of the 16-91 groove will correspond to the location of the 15-88 guides. Obviously, the 15-36 and 15-76 heads will begin and end their ready cycle in the same location seen as 14-77.

Triggering the 15-18 switch tells the CPU that a card is present and to switch to "Card Mode." The CPU will automatically select the mag-stripe reader head (15-36) and all "Card Mode" verification systems and functions. The 15-18 switch may be overridden by the 4-94 slot switch indicating a smart card is present. Triggering of both switches 4-94 and 15-18, will cause an abort. Triggering of either the 4-94 switch or 15-18 without proper triggering of 15-18A, indicating an invoice is present will cause an abort. Triggering of switch 15-86 in conjunction with either 4-94 slot switch or switch 15-18 will cause an abort.

Triggering the 4-94 slot switch tells the CPU that a "smart card" is present and to switch to the "Smart Card" mode. The CPU will automatically cancel the "cycle command" of the verifier head traction mechanism (4-24) since its function is not necessary in the "Smart Card" mode. Additionally, the CPU will automatically select all "Smart Card" verification/authorization and transaction functions with respect to record keeping, printing of the invoice, etc. Triggering of the 4-94 slot switch demands that an invoice be present and that the 15-86 not show a check present. A violation of either condition will cause an abort.

Triggering of switch 15-86 signals the CPU that a "check" is present and to switch to the "Check Mode." For the purposes of this disclosure, the term "Check" shall mean traveler's checks, government checks, personal checks, food stamps or any means of monetary payment which utilizes the Federal Reserve Bank's MICA system. The CPU will automatically select the 15-76 MICA reader head and all "check" verification systems and functions which shall include the phone-in module, the disk-drive, etc. Simultaneous triggering of the 4-94 slot switch, the 15-18 or the 15-18A with the 15-86 will cause an abort of the T/V/P Cycle.

Triggering the 15-18A signals the CPU that an invoice is present. It must be triggered with the 4-94 slot switch or the 15-18 to become usable information to the CPU.

After the retailer has inserted the proper combination of invoice, card, and check and has made the proper keypad entries, he will close the 1-2 lid to being the T/V/P Cycle. (Note: As mentioned in the first paragraph of the T/V/P Cycle text, the 3-15 switch is a dual function device. The two functions shall be entitled "3-15" and "3-15A." When the 1-2 cover is in its "rest" position between transactions, neither 3-15 or 3-15A is activated. Lifting the cover off the 3-15 switch triggers the CPU to receive the customer's PIN entry within 30 seconds. Once triggered, the 3-15 then becomes inert until the next cycle begins. Closing the 1-2 lid with the application of 6 oz. of pressure or more then triggers the 3-15A function which signals the CPU to begin the entire T/V/P Cycle.) When the 3-15A switch is triggered, the CPU then begins to ask a series of questions. All questions will be on an "'if yes,' proceed" and an "if 'no,' abort" basis. "Abort" shall mean that the 1-2 cover will "pop" open and the system will not have printed the invoice or caused any funds to be transferred in any way whatever including EFT. One option may be that an attempted purchase with a proven lost, stolen or counterfeit check or card will be recorded with the date, account number and dealer I.D. number (for location) to help the police in the apprehension of criminals. The questions might include:

(1) Does the system have standard 110 v. (220 v. for export) power? This shall be within the limits described elsewhere. If 'yes,' proceed—if 'no,' abort . . .

(2) Is the 1-2 or the optional 1095 cover locked as signified by the 3-20's being engaged?

(3) Are any of the onboard/outboard security systems or any of the 4-39 module security systems compromised?

(4) What mode is the system to function in as designated by responses from 15-18, 15-18A, 15-86 and 4-94 slot switches.

(5) Does the purchase price matrix mechanism (3-16, 15-10, 15-12) show an entry?

(6) Has a verified correct PIN number been entered at 4-44 within the 30 second time limit? The 30 second limit may be modified for more time if research mandates such a change. Verifying the PIN will involve comparison of the PIN entered by the customer with that computed by the 4-39 security modules, the PIN returned from the issuer's computer via a phone in module or verification via the MICA system.

(7) NOTE: If the retailer desires his funds to be electronically transferred to his account from the customer's card issuer, then the retailer must engage the "EFT" button shown at 15-92. This EFT process is an optional transaction process because using the EFT requires the use of phone lines which, if long distance, may be an additional operating cost. If the retailer desires his money immediately, he simply depresses switch 15-92.

(8) In the case of personal checks, does the account the check is drawn on show sufficient funds? The system anticipates the use of PIN's with personal checks to identify the writer and bearer of the check to be in fact the valid bearer. Also, a check of the account balance that shows sufficient funds would warrant the automatic stamping of "VERI." on the check. This would in some degree insure payment to the retailer. The "VERI." stamp is described as either 15-81 or 15-85. A preferred method would be to depress and engage the 15-92 EFT (electronic fund transfer) switch. This would initiate the EFT process as mentioned above. Again, this is the retailer's option since in a small community the customer may be known to the retailer, or for other reasons, the EFT process may not be cost effective and/or necessary.

(9) If in the "smart card" mode, does the card show sufficient funds? Does the card show a verified correct PIN entry? Has the card been prematurely removed from the 4-66 slot as indicated by the 4-94 slot switch?

The main system CPU keeps a running total of all sales for a given day or shift and will display them following a predescribed key command at 4-23. This display will show the total of funds paid to the retailer by cash, check or credit card at the POS; a separate total of all "EFT" funds transferred to the retailer's account in his bank (as per common practice) and a grand total of both.

The 4-39 modules will mount into the 4-28 drawer by sliding into appropriately spaced slots or "rails" and will be secured in place by a suitable machine screw. When the 4-39's are inserted fully into the drawer, they make contact via a reliable multi-pin connector with a parallel-wired circuit rail which in turn plugs into the system at 4-29. Thus, all 4-39 modules are wired similarly in parallel or "gangs" and all receive identically the same information. However, when one module "recognizes" its algorithm, processes the input and returns an "accept" signal to the system, the passive outputs (at this stage) of the other 4-39's will not impede the transmission of this "accept" command to the system.

Figure 13:
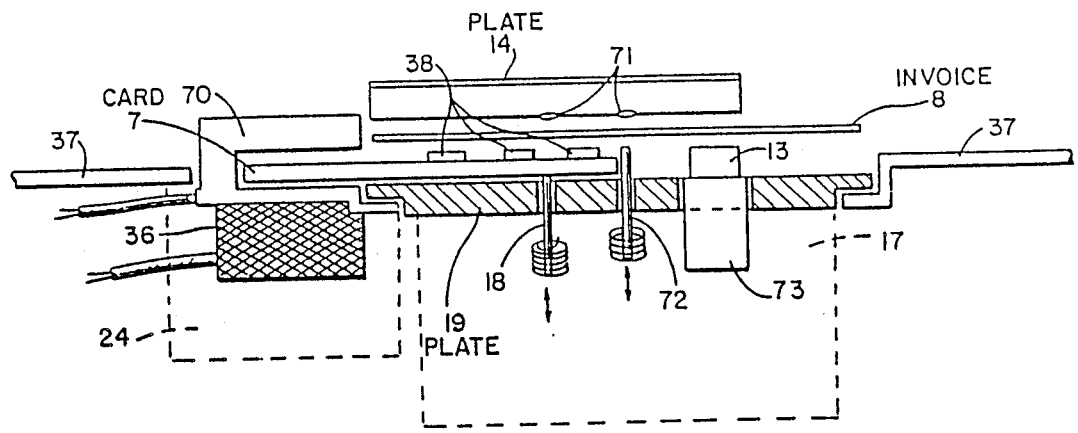
FIG. 13 is a partial side view of the read head detection mechanisms.
Figure 16:
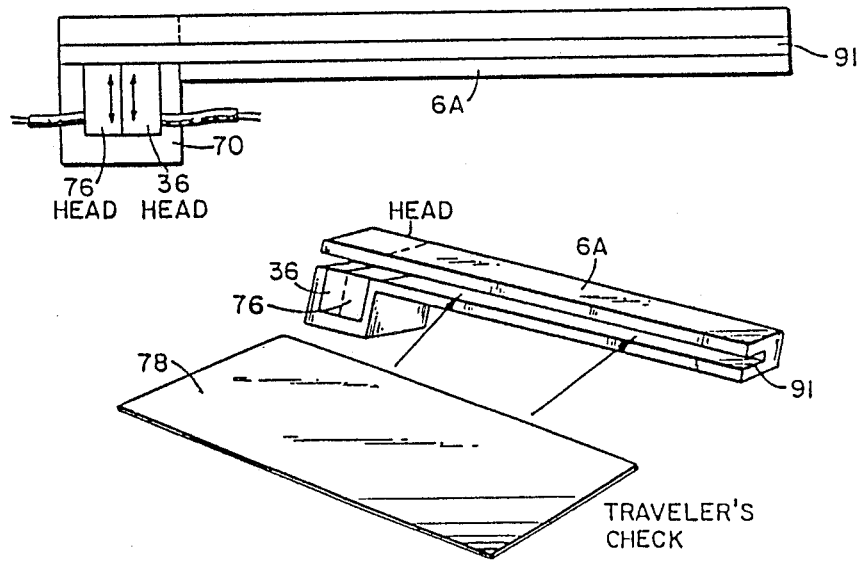
FIG. 16 is a diagrammatic view of the mechanism for detecting travelers checks.

FIGS. 13 and 16 show an alternative design to that discussed so far in this section. This alternative design more readily accommodates traveler's checks, personal checks, food stamps, etc. and in fact constitutes refinement and improvement over that system shown in FIGS. 5 and 6. A MICA reader device, 14-76, 15-76, and 16-76, such as that in common use by the Federal Reserve Banking System is installed adjacent to the 13-36 (14-36 and 15-36) mag-stripe reader head. This is possible since the three mag-stripe tracks on common credit cards and the MICA line on all checks are in such close proximity as shown by Figure 15. Due to strict Standard's regulations, this phenomenon is likely to remain indefinitely. As has been previously stated, the selection of which "head" to use is automatically made prior to verifier movement by the system's CPU in association with the switches numbered 15-18, 15-18A and 15-86. The position of the MICA, PIN, or offset number on the 15-78 check is shown at 15-75A and will be read as a part of the routing and transit numbers and account numbers preceding it in the MICA line.

Figure 14:
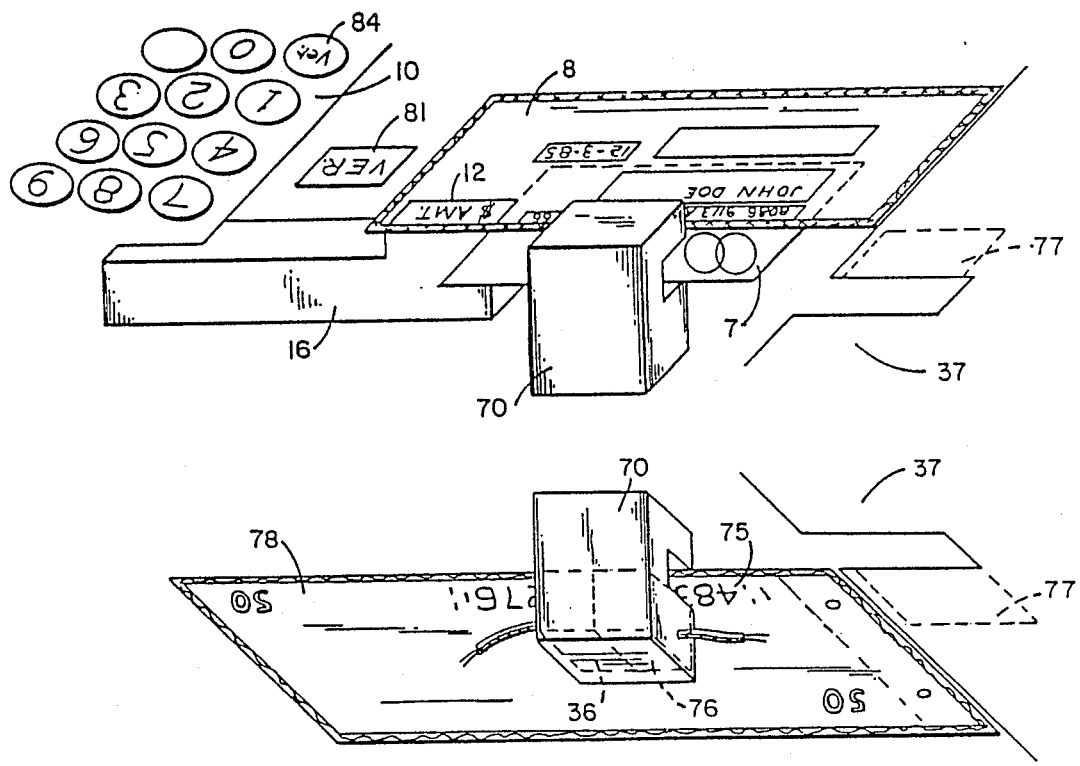
FIG. 14 is a diagrammatic view showing both top and bottom views of the use of credit cards, checks, invoices, and travelers checks.

FIGS. 14 and 16 show the correct method of inserting the travelers checks and all instruments with MICA line information to allow MICA reading. They are inserted into the 16-91 slot upside down with the MICA line toward the front of the machine, which means the MICA line must be closest to the 14-70, 16-70 read-head assembly. Since the 14-70 and 16-16A devices are attached forming a single unit, reliable tracking is assured during the entire field of motion. This device has been designed to be field up-gradable. This is to say, if a buyer operates in an area where certain functions described herein may not be cost-effective or are simply not applicable or necessary to his business operations, he may purchase the device without, for example, the EFT circuitry. Further, perhaps the buyer does not need the MICA check functions, he doesn't have to purchase them. However, the 1-1 main case, 1-2 cover include all provisions for field installation of the additional functions described herein and some which may not be described and are the subject of future patent work. A further example would be a new, American made pick-up truck which may be ordered without a radio but provisions have usually been made so that the dealer can add one.

If in the event certain functions (but *not* security measures) should fail in this device or outboard devices such as Payer's Bank's hardware/software, provision has been made for a standard telephone headset which would allow the retailer to get into direct voice contact with the appropriate issuer. This voice contact would allow for authorization or credit/debit card transactions and check transacations in the event of a malfunction. However, it should be noted that the customer's PIN number entered at the PIN keypad will be transmitted as encrypted digital information to the issuer thereby denying the PIN number to onlookers, passer-by, retail clerks, etc. Further, in the event of certain types of malfunctions and/or difficulties such as a card or check reported stolen or counterfeited to the issuer's computer, the "phone in" light on top of the device shown at 1-3-G would light alerting the retailer to pick up the headset for a verbal message for appropriate actions. The issuer may be required to signal the device in an encrypted manner and means to allow the device to function properly and allow the transaction to proceed to completion. This is in no way a compromise of system/device security nor should be construed as such.

It will, of course, be understood that various changes may be made in the form, details, arrangement and proportions of the parts without departing from the scope of the invention which consists of the matter shown and described herein and set forth in the appended claims.

What is claimed is:

1. A secured point-of-sale mechanism comprising:
   (a) a closable two compartment housing having a secured portion which includes printer means and a plurality of signal devices indicating the condition of a plurality of circuits contained in said secured portion of said housing;
   (b) an unsecured door portion cooperating with said secured portion for completing said two compartment housing;
   (c) a monetary negotiable instrument section disposed within said unsecured portion having a first part for retaining a credit card, a second part for retaining an invoice of a point-of-sale transaction, a third part for retaining a check for a point-of-sale transaction, a fourth part for retaining any monetary negotiable instrument, a fifth part for identifying the payee of said transactions, and a sixth part for establishing the transaction selling price;
   (d) a transaction price index settable to the correct sales amount purchased by a customer;
   (e) a first plurality of switching mechanisms having a first part fixed in said secured portion of said housing and a second part extending into said unsecured portion of said housing to be actuated by said unsecured door portion;
   (f) printer means;

(g) a second plurality of switching mechanisms having a first part fixed in said secured portion of said housing and a second part extending into said unsecured portion of said housing to be actuated by a combination of monetary negotiable instruments; and (h) a locking mechanism connected to said plurality of switching mechanisms and disposed between said secured and unsecured portions of said housing for securing said housing against invasion as long as said plurality of switching mechanisms are actuated.

2. The invention as set forth in claim 1 which further comprises means to access a computer system maintained by an issuer of a negotiable instrument.

3. The invention as set forth in claim 1 which further comprises means to access an external communication system to identify a payor of a negotiable instrument and perform an electronic funds transfer.

4. The invention as set forth in claim 1 which further comprises telephonic means to communicate with the issuer of a negotiable instrument.

5. The invention as set forth in claim 1 which further comprises telephonic means to communicate with the issuer of a credit card.

6. The invention as set forth in claim 1 which further comprises a keypad, for customer use, which is located outside the closable two compartment housing.

7. The invention as set forth in claim 1 which further comprises:
a standard 8 bit microprocessor capable of accessing 64 K bytes of memory; and
means connecting said plurality of switching mechanisms and said locking mechanisms to said microprocessor and upon any one of said switching mechanisms not being actuated, said locking mechanism seeking an inoperable position.

8. The invention as set forth in claim 2 including:
a printing mechanism having a pair of plates spatially disposed about any of said credit cards, invoices, checks or other monetary negotiable instruments; and
an actuating mechanism cooperating with said printing mechanism for producing an imprinted instrument of said transaction; and
a lock disabling mechanism connected to said actuating mechanism and said locking mechanism, said locking mechanism being disable after creating an imprinted monetary negotiable instrument.

9. The invention as set forth in claim 1 which furthe rcomprises:
read head means connected to said microprocessor and disposed adjacent said credit card for reading any magnetic code that is detectable in said card; and
read head transport means producing movement of said read head means under said credit card as long as said code is being detected by said read head.

10. The invention as set forth in claim 1 which further comprises:
a monetary negotiable instrument carrying a MICA stripe on its surface disposed within said secured portion having a first part for retaining said MICA stripe;
said monetary negotiable instrument also carrying a magnetic stripe on its surface disposed within said secured portion having a first part for retaining said magnetic stripe;
read head means connected to said microprocessor and disposed adjacent said monetary negotiable instrument to read any code impressed therein;
PIN identification number entry means connected to said microprocessor for receiving a PIN number; and
means including said microprocessor connecting said read head means and said PIN identification number entry means to said printing mechanism and said actuating mechanism said printing mechanism to be actuated when said signals are the same.

11. The invention as set forth in claim 1 which further comprises:
an override mechanism;
a smart card key pad connected to said override mechanism having detection means for detecting the presence of said smart card;
a personal identification number module having a key tab matrix connected to said microprocessor, said key tab matrix having been set to match the transaction amount to be recorded; and
said override mechanism being connected to said microprocessor for actuating said printing mechanism and said lock disabling mechanism.

12. the invention as set forth in claim 1 which further comprises:
a high strength steel drawer slidable within said secured portion of said two compartment housing, said drawer having individual electrical compartments for containing said security modules;
wide flange means formed on the outside of said steel drawer to engage said two compartment housing;
a connector electrically connected to said individual electrical compartments in said steel drawer and to said microprocessor; and
locking means securing said steel drawer within said two compartment housing and further securing said security modules to said steel drawer.

13. The invention as set forth in claim 1 which further comprises:
a first read head connected to said microprocessor and disposed adjacent a first monetary negotiable instrument within said section;
a second read head connected to said microprocessor and disposed adjacent a second monetary negotiable instrument within said section;
a track mechanism for guiding a transport means;
first transport means producing movement of said first read head over said track mechanism;
second transport means producing movement of said second read head over said track mechanism; and
means connecting said first and second transport means to said microprocessor and causing movement of the same as long as a code is being detected by said first and second read heads.

* * * * *